United States Patent [19]
Hayakawa

[11] Patent Number: 5,764,398
[45] Date of Patent: Jun. 9, 1998

[54] OPTICAL READER WITH VIBRATING MIRROR

[75] Inventor: Hiroshi Hayakawa, Urawa, Japan

[73] Assignee: Opticon, Inc, Orangeburg, N.Y.

[21] Appl. No.: 735,588

[22] Filed: Oct. 23, 1996

Related U.S. Application Data

[60] Division of Ser. No. 405,538, Mar. 16, 1995, Pat. No. 5,610,752, which is a continuation-in-part of Ser. No. 889,603, May 27, 1992, Pat. No. 5,436,753.

[51] Int. Cl.[6] .................................................. G02B 26/08
[52] U.S. Cl. ..................... 359/203; 359/198; 359/199; 359/201; 359/213; 235/467
[58] Field of Search ............................. 359/198–201, 359/203, 212–215, 221, 225, 226; 235/462, 467, 472; 358/473, 296; 310/36, 40 R

[56] References Cited

U.S. PATENT DOCUMENTS

| | | | |
|---|---|---|---|
| 5,596,446 | 1/1997 | Plesko | 359/214 |
| 5,629,790 | 5/1997 | Neukermans et al. | 359/201 |

Primary Examiner—James Phan
Attorney, Agent, or Firm—Henry I. Schanzer

[57] ABSTRACT

Systems embodying the invention include a vibrating arm having one side on which is mounted a reflective surface for sweeping a beam of light across a target whose contents are to be read. The vibrating arm includes a bar of magnetic material pivoted about its center so as to be able to rotate freely (i.e., be "movable"). The ends of the "movable" bar are located between the side walls of a stationary (i.e., non-moving or fixed) yoke of magnetic material with a driving coil located between the ends of the movable bar and the side walls of the stationary yoke. The stationary yoke is of magnetic material for concentrating a magnetic field encompassing the movable bar, the coil and the stationary yoke. The combination of the movable bar and the yoke are configured to produce a magnetic field such that with no current in the driving coil, the movable bar has a defined equilibrium (or rest) position and when the movable bar is displaced from its equilibrium position a magnetic restoring torque is present such that the movable bar oscillates about its equilibrium, position. In a preferred embodiment the bar is a permanent magnet and the yoke is made of magnetic material. A varying current signal is selectively supplied to the driving coil to control the frequency and amplitude of the vibrations of the movable bar.

16 Claims, 12 Drawing Sheets

# OPTICAL READER WITH VIBRATING MIRROR

This application is a divisional of application Ser. No. 08/405,538 filed on Mar. 16, 1995, now U.S. Pat. No. 5,610,752, which is a continuation-in-part of my previously filed patent application, filed May 27, 1992, entitled Vibrating Mirror, bearing Ser. No. 07/889,603, now U.S. Pat. No. 5,436,753, and whose teachings are incorporated herein by reference.

BACKGROUND OF THE INVENTION

This invention relates to optical readers and in particular to optical readers including means for sweeping a light beam across a target and sensing the light signals reflected from the target.

In certain applications, such as a bar code reader, it is desirable and/or necessary to scan, or sweep, a light beam across a target, such as a bar code, and to sense light signals reflected from the bar code to subsequently decode the information encoded in the bar code. FIG. 7A illustrates the format a bar code may have (parallel bars of different widths and spacing) and a laser light beam sweeping across the bar code (i.e. the target). A known method for sweeping a light beam across a bar code includes a stepper motor used to turn a mirror arrangement as shown in FIGS. 7B and 7C. A light source which may be a laser or a light emitting diode (LED) is beamed onto the surface of the mirror. The mirror is rotated beta degrees by the stepper motor which causes the light beam to sweep through an angle of two beta degrees across a target (e.g. a bar code).

Another method for sweeping a light beam across a target includes the use of a miniature motor attached to a polygon mirror whose rotation is controlled by the motor, as shown in FIGS. 7D and 7E. Each surface or face of the "rotating" polygon is highly polished and functions as a mirror causing a light beam incident on the surface of the polygon to sweep across the target.

FIG. 7E shows the polygon mirror (pm) and the rotating driving motor (dm) which are independently constructed and respectively connected directly, or through a speed deceleration or reduction mechanism, with a rotating driving axis.

FIGS. 7D and 7C show the single plane/face mirror (m) and the stepper motor (gm) which are independently constructed and respectively connected with a rotating driving axis.

Normally, the polygon mirror (pm) and the rotating driving motor (dm) used for the light beam scanning arrangement as per FIGS. 7D and 7E are constructed as separate and independent elements. Consequently, the size and in particular the height (i.e., the dimension in the direction of the rotating and driving axis) cannot easily be reduced. Also, as the rotating driving motor (dm) is used, the dimension of the direction in the front and the rear (the dimension in the direction perpendicular to the direction of the rotating driving axis) cannot be easily reduced.

Similarly, the single plane/face mirror (m) and the stepper motor (gm) used for the light beam scanning arrangement as per FIGS. 7B and 7C are constructed as separate and independent elements. Consequently, the height (the dimension in the direction of the rotating driving axis) cannot easily be reduced. Also, as the stepper motor is used, the dimension of the direction in front of and the rear (the dimension in the direction perpendicular to the direction of the rotating driving axis) cannot be reduced easily.

OBJECT OF THE INVENTION

It is an object of this invention to reduce the size (e.g. height, width and depth) of a vibrating mirror assembly used to reflect a beam of light and to project it across a target.

It is another object of the invention to eliminate the need for mechanical springs to control the travel (e.g. amplitude) of the vibrating assembly, whereby the wear and tear of the vibrating assembly is decreased.

It is another object of the invention to have a vibrating assembly whose amplitude and frequency of vibration can be more easily controlled.

It is an object of this invention to have a vibrating assembly which has a mechanical resonant frequency.

It is an object of this invention to enable operation of the vibrating assembly at, or close to, its resonant frequency to provide very low power operation.

It is another object of this invention to enable operation of the vibrating assembly in a resonant mode or in a non-resonant mode whose operation is well controlled.

It is another object of this invention to reduce and/or eliminate the need for mechanical stops.

SUMMARY OF THE INVENTION

Systems embodying the invention include a vibrating arm having one side on which is mounted a reflective surface for sweeping a beam of light across a target whose contents are to be read.

A vibrating arm embodying the invention includes a bar of magnetic material pivoted about its center so as to be able to rotate freely (i.e., be "movable"). The ends of the "movable" bar are located between the side walls of a stationary (i.e., non-moving or fixed) yoke of magnetic material with a driving coil located between the ends of the bar and the side walls of the stationary yoke. The driving coil is formed with a predetermined number of turns of closely wound wire so that when an alternating current is applied to the coil it produces a magnetic field causing the movable arm to move. The stationary yoke is of magnetic material for concentrating a magnetic field encompassing the movable bar, the coil and the stationary yoke. The combination of the movable bar and the yoke are configured to produce a magnetic field such that with no current in the coil, the movable bar has a defined equilibrium (i.e., rest or stand-still) position and when the movable bar is displaced from its equilibrium position a magnetic restoring torque is present such that the movable bar oscillates about its equilibrium position.

In a preferred embodiment the movable bar and the stationary yoke are configured to produce a magnetic field which is of a generally rectangular nature with a middle transverse line in the center of the rectangle defining two generally square shaped regions, with the equilibrium (stand-still or rest) position of the movable bar lying along the transverse line.

In a preferred embodiment the movable bar is a permanent magnet and the yoke is made of magnetic material. The movable bar may also comprise two separate permanent magnets interconnected mechanically and magnetically by a "movable" yoke. In some embodiments the stationary or fixed yoke may be magnetized or have a permanent magnet attached thereto and the "movable" bar is of magnetic material. The stationary yoke may be rectangular, square or U shaped. The sides of the stationary yoke may be straight or curved, with the curve being concave or convex. Likewises the ends of the movable bar may be straight or curved with the curve being concave or convex.

Vibrating arms in accordance with the invention may include a "reflecting" mirror on one side of the movable bar and a "receiving" mirror on another side of the movable bar.

BRIEF DESCRIPTION OF THE DRAWINGS

In the accompanying figures like reference characters denote like components.

DETAILED DESCRIPTION OF THE INVENTION

Figure 1A:
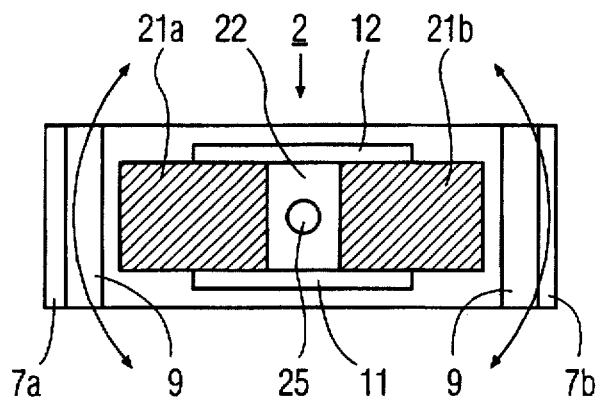
FIGS. 1A, 2A and 3A are simplified, cut away, top views of part of various vibrating mirror assemblies employing two mirrors embodying the invention.

Referring to FIG. 1A there is shown a vibrating mirror assembly comprising a rectangular movable arm 2, designed to rotate and/or vibrate back and forth about a shaft 25. The rotation of the arm 2 is illustrated by the double headed arrows shown in FIG. 1A. The vibrating movable arm 2 includes sections 21a and 21b, which are permanent magnets interconnected by a yoke 22. The yoke 22 is located between magnets 21a and 21b coupling them magnetically and mechanically. The rectangular arm 2 may be a bar of length, L, width, W, and height, H, as shown in FIG. 1G. The ends of the bar need not be straight as shown, but could be curved, concavely or convexly. The yoke 22 may be of "ferrous" or any suitable magnetic material and it may be referred to as a "movable" yoke to differentiate it from the "stationary" yoke 7.

A first reflective surface 11 is located on the front side of the vibrating arm 2 and a second reflective surface 12 is located on the back side of arm 2. Reflective surfaces 11 and 12 may be mirrors or any highly polished and/or reflective surfaces. On either side of magnets 21a and 21b is a section 9 in which the driving coils are located. The driving coils are formed by closely or tightly winding many turns of insulated wire in a rectangular or square shape as shown in FIG. 1F; with several different winding configurations being possible. In operation, an AC current (or pulses of current of alternating polarity) is supplied to the coils 9 to induce magnetic attraction and repulsion causing the arm 2 to vibrate. A fixed yoke 7 of suitable magnetic material encloses the vibrating mirror assembly for providing a preferred closed magnetic path.

Figure 1B:
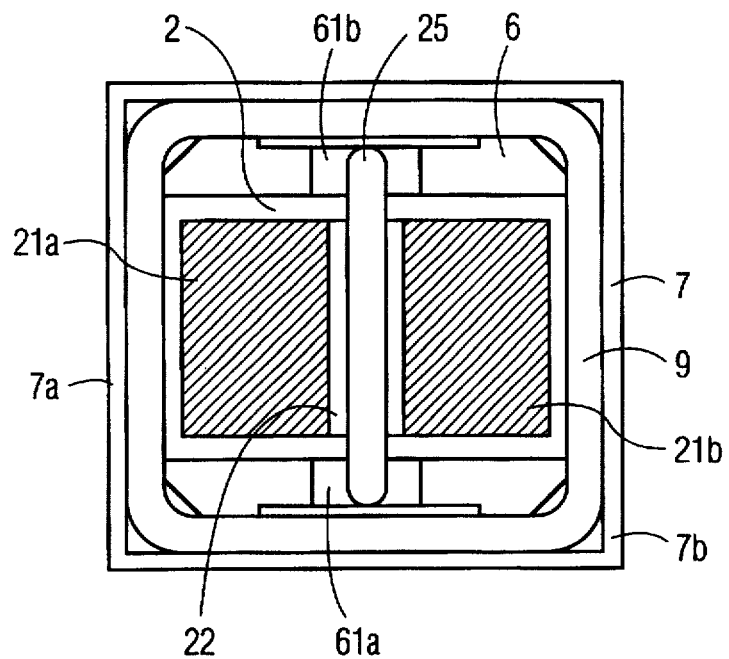
FIG. 1B is a simplified cross sectional view of the vibrating mirror assembly of FIG. 1A.

As shown in FIGS. 1A and 1B, the vibrating assembly 2 is mounted on a shaft or axis 25 which is free to rotate. In FIGS. 1A and 1B the movable part 2 includes a frame to hold the first and second permanent magnet portions 21a and 21b. The first and second magnets 21a and 21b are coupled to each other via yoke 22 centered around and about shaft 25.

Figure 1C:
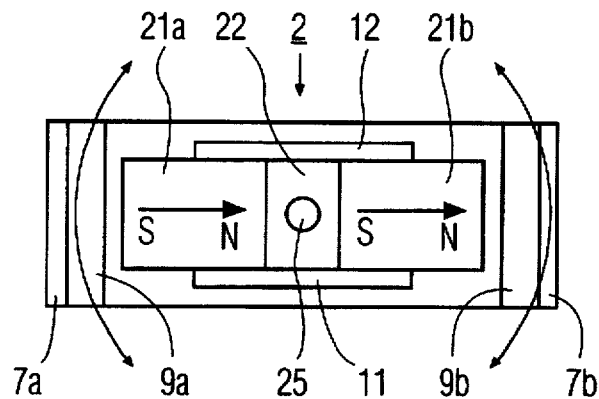
FIG. 1C is intended to illustrate that the magnet 21a, 21b is magnetized in a perpendicular direction to the axis of rotation.

In the design of vibrating arm 2, the center of the principal axis of inertia and the rotating axis 25 are at the same position. The distribution of all components is symmetrical and balanced about the rotating axis 25. The movable magnets 21a and 21b are magnetized perpendicularly to the rotating axis 25 as shown in FIG. 1C. In FIGS. 1A and 1B, the fixed yoke 7 is generally square shaped and the opposite sides 7a and 7b of the fixed yoke 7 are illustrated as being straight. However, it should be understood that the sides 7a and 7b may be slightly curved or rounded and may be concave or convex. The driving coil 9 in this embodiment could be generally square shaped and fixedly mounted onto the fixed yoke (7).

A holder 6 (See FIG. 1B) is located within the inner cavity of the vibrating mirror assembly and includes a pair of bearings 61a, 61b at its top and bottom into which the ends of the rotating axis 25 can be inserted. So mounted, the rotating axis 25 can rotate freely in all directions while held by a pair of axis bearings 61a, 61b inside holder 6.

The movable arm 2 is located in between a pair of opposite sides 7a and 7b of the fixed yoke 7. As noted above, the shape of movable bar 2 at its right and left edge may be slightly curved or rounded and may be concave or convex. Generally, the shape of the movable arm 2 at its right and left edge may have a similar shape as that of the opposite side 7a and 7b of the fixed yoke 7. In the embodiment shown in FIGS. 1A and 1B, the ends of movable arm 2 are shown to be relatively straight.

Figure 1D:
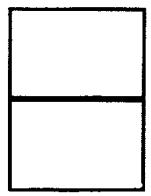
FIG. 1D illustrates the shape of the magnetic circuit produced in accordance with the invention.
Figure 1E:
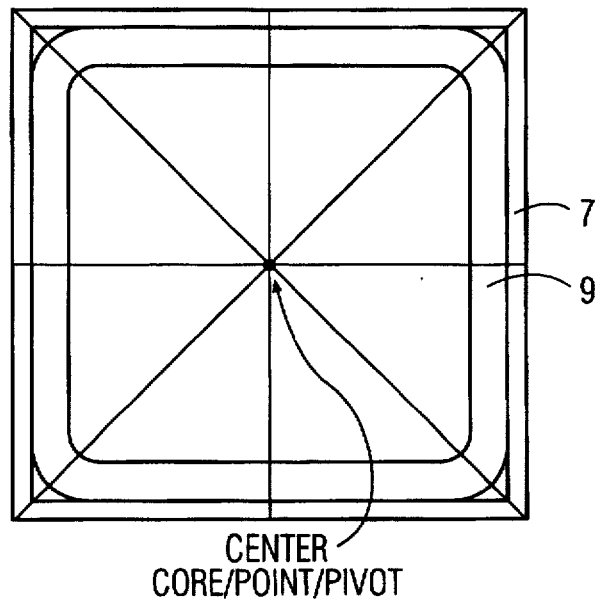
FIG. 1E illustrates that yoke 7 and the coil 9 have the same center point.
Figure 1F:
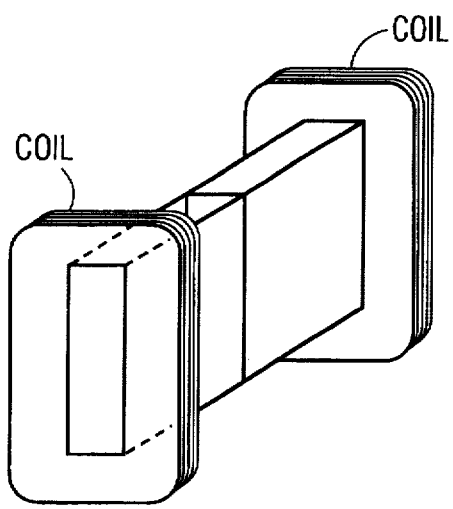
FIG. 1F illustrates the tight or close winding of the driving coil 9.
Figure 1G:
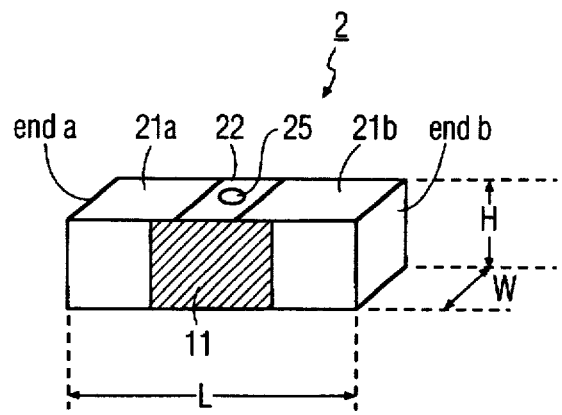
FIG. 1G is an isometric view of the bar or arm 2.

The movable part 2 and the fixed yoke 7 produce a closed, "figure 8" like, magnetic circuit as shown in FIG. 1D. In a preferred embodiment, the center core or point of the driving coil 9 is located at the same center point as that of fixed yoke 7, as shown in FIG. 1E. A first reflective mirror, "scanning mirror" 11, is mounted on one side (i.e., in front) of the movable arm 2 and a second reflective mirror, light receiving mirror 12, is mounted on the other side (i.e., behind) the movable arm 2.

The magnets 21a, 21b of the movable arm 2 can be formed of one continuous piece of material or 3 different pieces (e.g., 21a,22,21b), or several different pieces. The "movable" yoke 22 on movable arm 2 is preferably, of magnetic material but non-magnetized material also can be used. The holder 6, the fixed yoke 7 and the driving coil 9 comprise the fixed or stationary part (i.e., they do not move) of the vibrating mirror assembly.

The vibrating arm assembly forming a scanning device with vibrating mirrors as taught in this patent application can be designed to have a smaller or larger configuration. For example, one assembly may have the following approximate dimensions: 1 cm long, 2 cm wide, 1.5 cm thickness. When desirable, these dimensions can be reduced significantly; i.e., by 25 percent or more.

At all times the attraction force of the static magnetic field is active between the magnets (21a, 21b) of the movable arm and the adjacent opposite sides 7a, 7b of the fixed yoke 7. In other words, the magnetic spring force (rotating moment) acts, at all times, to return the movable arm 2 to the stand-still or equilibrium position (shown in FIG. 1A) where the magnets 21a, 21b and the opposite sides 7a, 7b of the fixed yoke 7 come closest to each other. The amplitude of the magnetic spring force may be expressed, approximately, as follows:

$$\text{Magnetic spring force (rotating moment)} = (k)(\sin \Theta) \quad (1)$$

Where:

k=spring constant (constant proportional to attraction force of movable magnet); and Θ=rotating angle of movable arm Therefore, when no current is supplied to the driving coil 9, and when the movable arm 2 is released after being moved slightly away (displaced) from the stand-still (i.e., equilibrium) position, the movable arm oscillates (vibrates) alternately in one direction and then in the opposite direction and returns to the stand-still position (i.e. equilibrium) with attenuating amplitude.

The vibration equation describing this motion may be expressed as follows:

$$I\,(d^2\Theta/dt^2) + c(d\Theta/dt) + (k)(\sin \Theta) \pm f = 0 \quad (2)$$

Where:

I=moment of inertia of movable arm 2;

Θ=rotating angle of movable arm;

c=constant of viscous damping;

k=spring constant (moment required to twist unit angle and proportional to attraction force)

f=dry friction force t=time

When the dry friction force (f) may be ignored, equation (2) may be rewritten as follows:

$$I\,(d^2\Theta/dt^2) + c(d\Theta/dt) + (k)(\sin \Theta) = 0 \quad (3)$$

As may be deduced from equations (2) and (3), the natural angular frequency (resonant frequency) is determined by the moment of inertia (I) of the movable arm 2 and the spring constant k, (i.e., the attraction force of the movable magnets 21a, 21b with the sides of the yoke 7).

When the shape of the opposite sides 7a, 7b of the fixed yoke 7 and the right and left edges of the movable magnets 21a, 21b is curved at the horizontal cross section, the attraction force between the opposite sides 7a, 7b and the movable magnets 21a, 21b is reduced because the extent of increase in the magnetic energy in the gap due to variation of the rotating angle Θ is reduced. Therefore, it is advantageous that the spring constant be reduced and the natural angular frequency resonant be reduced.

When an alternating current (AC) is supplied to the driving coil 9, an AC magnetic field is produced going across the movable magnets 21a, 21b in the same direction. Due to this AC magnetic field a rotating moment is generated alternately forcing the movable arm to go in one direction and then in the opposite direction. The amplitude of the rotating moment due to the AC magnetic field may be expressed as follows:

$$\text{Rotating moment due to AC magnetic field} = (P\cos wt)(\cos \Theta) \quad (4)$$

where:

P=constant proportional to the amplitude of the AC current; and w=is the frequency of the AC current.

The magnetic spring force (k) (sin Θ) due to the permanent magnets 21a, 21b and the rotating moment due to the AC magnetic field (Pcoswt) (cos Θ) are operative on the movable part 2 at the same time. The vibration equation for this condition may be expressed, approximately, as follows:

$$I\,(d^2\Theta/dt^2) + c\,(d\Theta/dt) + (k)\,(\sin \Theta) = (P\cos wt)(\cos\Theta) \quad (5)$$

where:

I=moment of inertia of movable arm 2;

Θ=rotating angle of movable arm 2;

c=constant of attenuation;

k=spring constant proportional to attraction force;

t=time; and

P=constant proportional to AC current amplitude.

As may be deduced from equations (4) and (5) the angular vibration and the amplitude of oscillation (i.e., reverse rotating vibration or induced vibration) is determined by the amplitude and frequency of the AC current. When the rotating angle Θ is small, sinΘ is approximately equal to Θ and cosΘ is approximately equal to 1. Therefore, the vibration equation may be reduced as follows:

$$I\,(d^2\Theta/dt^2) + c(d\Theta/dt) + k\Theta = (P)(\cos wt) \quad (6)$$

An approximate wave form of the reverse rotating vibration (induced vibration or oscillation) at the time of transient state may be given by solving equation 6.

Figure 6:
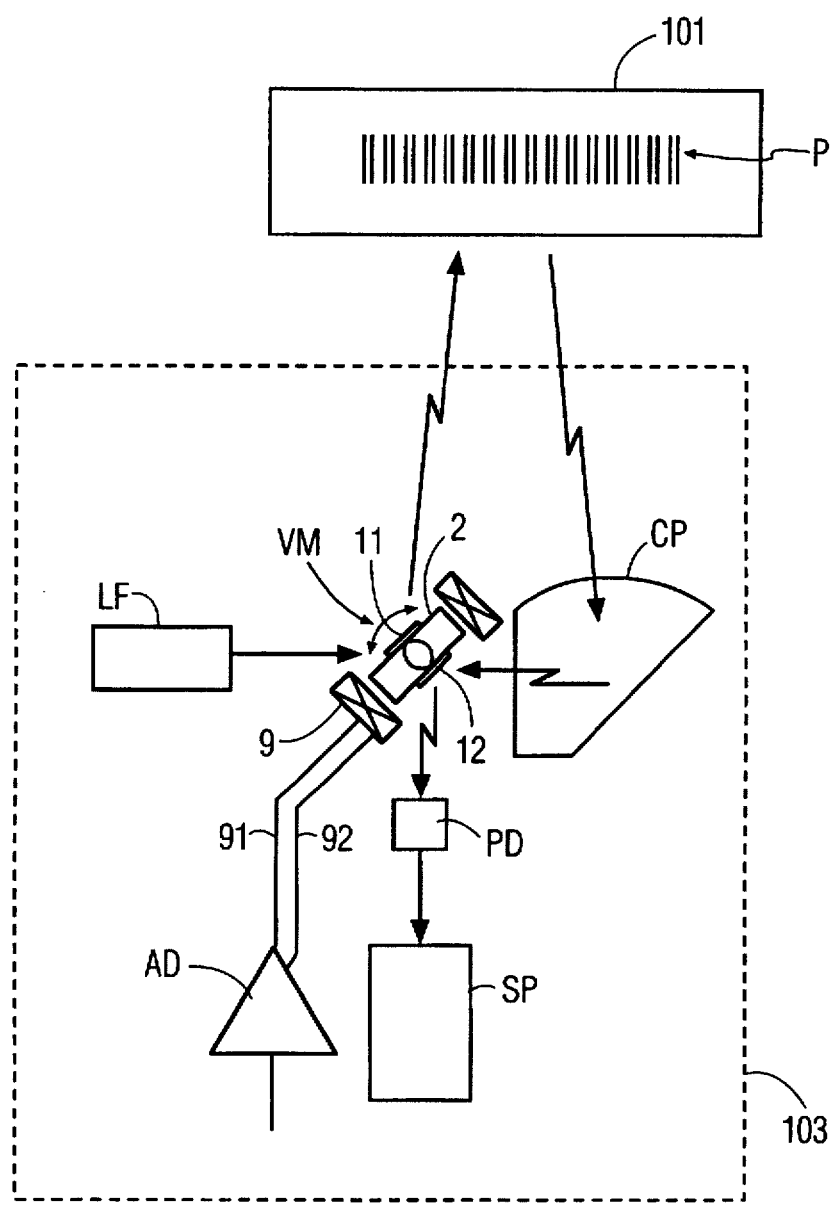
FIG. 6 is a simplified block diagram of a system embodying the invention with vibrating mirror assemblies of the type shown in FIGS. 1, 2 and 3.
Figure 7A:
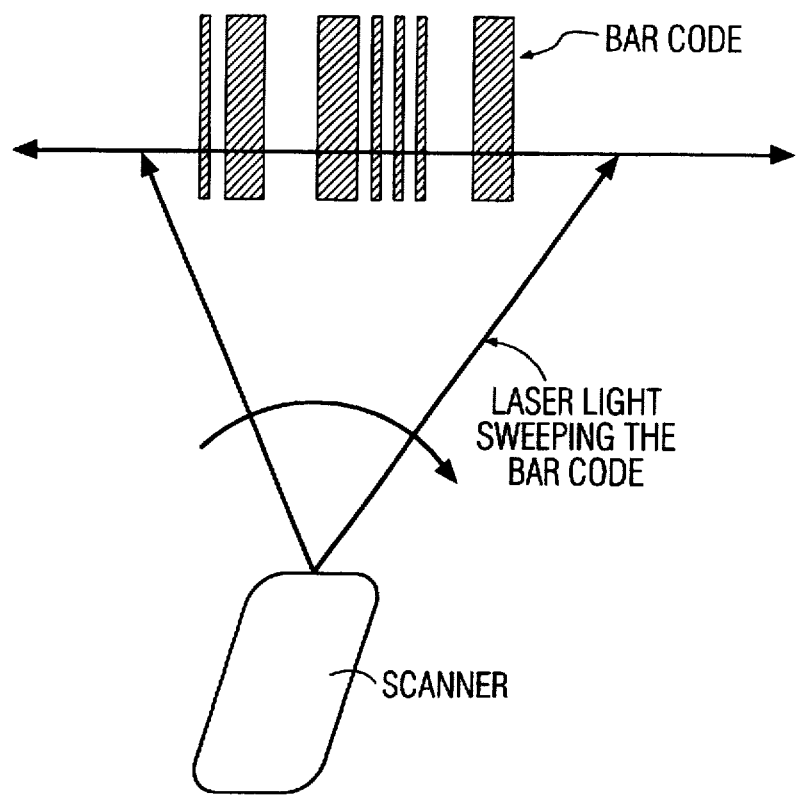
FIG. 7A is a diagram illustrating known scanning of a bar code format.
Figure 7B:
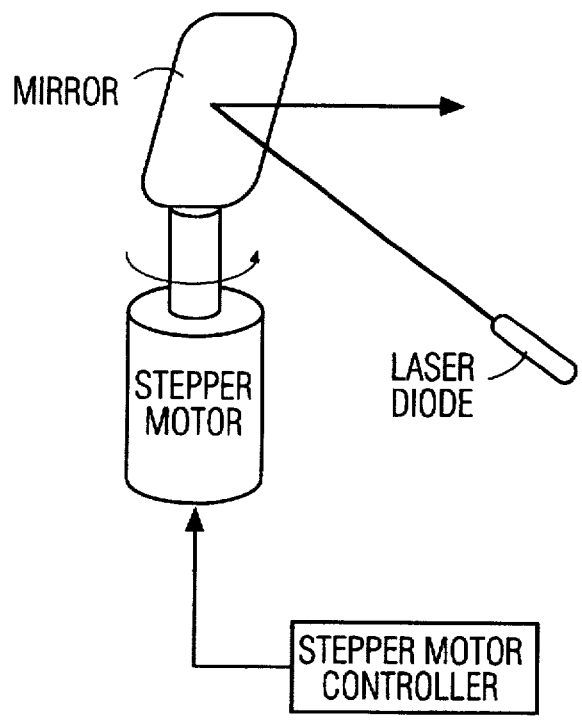
FIGS. 7B and 7C illustrates a stepper motor driving a mirror in accordance with the Prior Art.
Figure 7C:
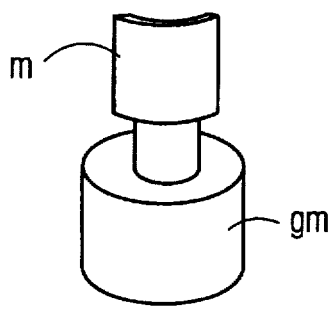
Figure 7D:
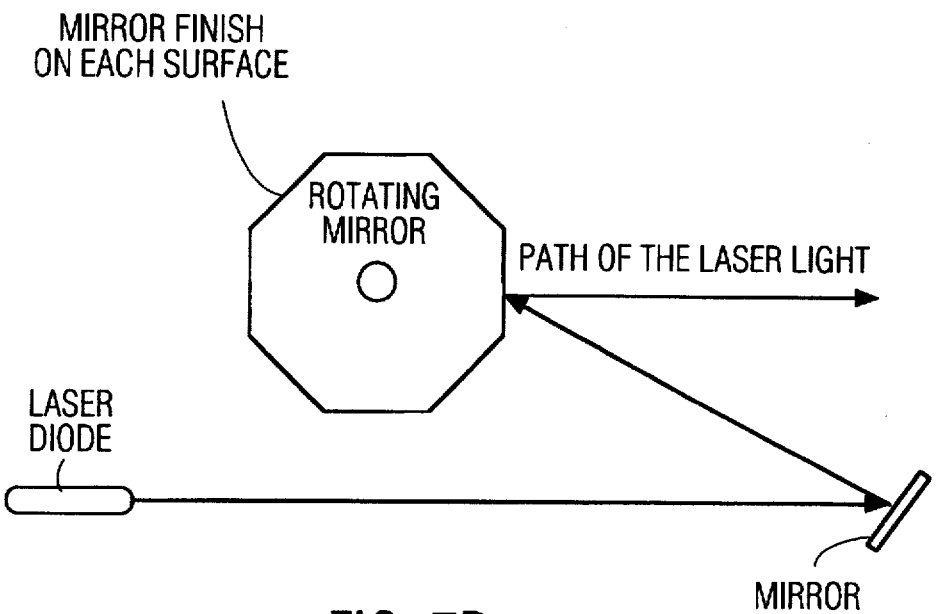
FIGS. 7D and 7E illustrate the use of a polygon mirror to sweep a light beam across a target in accordance with the Prior Art.
Figure 7E:
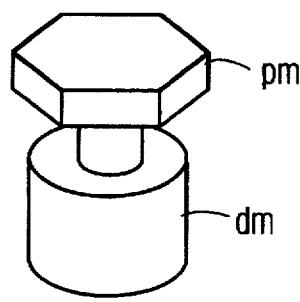

As shown in FIG. 6, when the movable arm 2 operates in the oscillatory mode (reverse rotating vibration), a light beam incident onto the first reflective mirror, scanning mirror located in front of the movable arm 2 is swept across an optical information pattern (P). The light reflected from the pattern (P) is then projected onto the second reflective mirror (receiving mirror 12) located in back of the movable arm 2. The light impinging on mirror 12 is then projected onto the receiving surface of a photo diode (PD).

The scanning device with vibrating mirrors in this patent application may be used in a resonant frequency mode or a non-resonant frequency mode. In the resonant frequency mode, the frequency of the AC current supplied to the driving coil 9 is selected to be equal, or close, to the natural angular frequency (resonant frequency) of the movable arm 2. The resonant frequency can be adjusted by adjusting the moment of inertia (I) and/or the magnetic spring force between the movable magnets 21a, 21b and the yoke 7.

Characteristics of the resonant frequency mode are as follows:

1) The movable arm rotates or vibrates at a rate equal, or close, to the resonant frequency.

2) The vibration of the movable arm is sinusoidal.

3) The current and hence the power to operate the assembly can be drastically reduced. Actual use with less than 5 mA is possible.

4) The amplitude (scan width) of the vibration can be controlled by controlling the amplitude of the applied current.

5) The movable arm can vibrate at a rate producing more than 100 scans/sec. This is a significant advantage, particularly when it is recognized that this can be achieved with low current and power.

In the resonant frequency mode, the frequency of (W) of the AC current to the driving coil 9 should not be substantially less (or greater) than the resonant frequency of the movable arm 2. By maintaining this criterion the distortion of the wave form in the transient state (offset from sine wave) can be avoided.

Characteristics of non-resonant frequency mode of operation are as follows:

1) Operation of the vibrating arm assembly can be achieved at a substantially lower frequency than that of the resonant (natural) frequency.

2) Following operation to the applied current wave form is available. Scan speed, scan width and velocity of scanning line, etc. can be optionally controlled.

In the non-resonant frequency mode of operation, inner loss or outer damper can be given. Further, as an over-damp, non cyclic motion (creeping motion) can be made. In this instance, better control is obtainable.

Figure 1H:
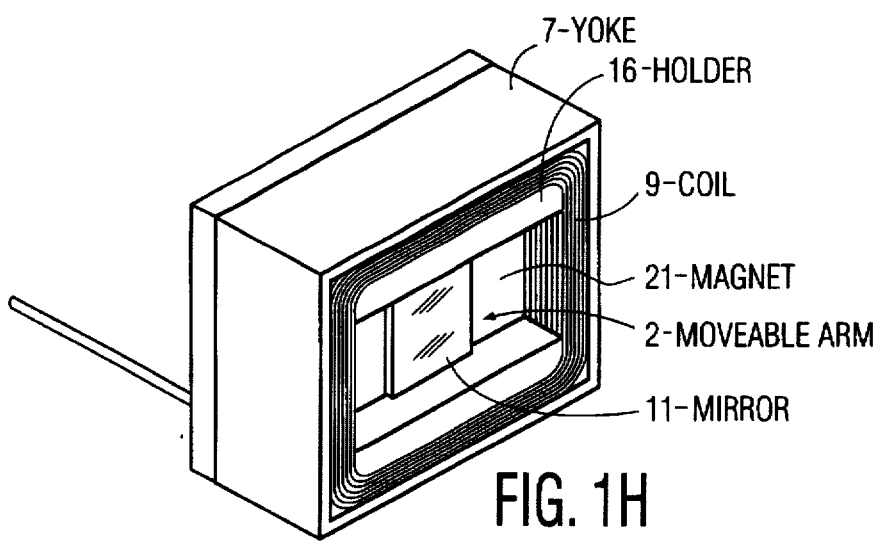
FIG. 1H is an isometric view of an embodiment of a vibrating mirror assembly in accordance with the invention.
Figure 1J:
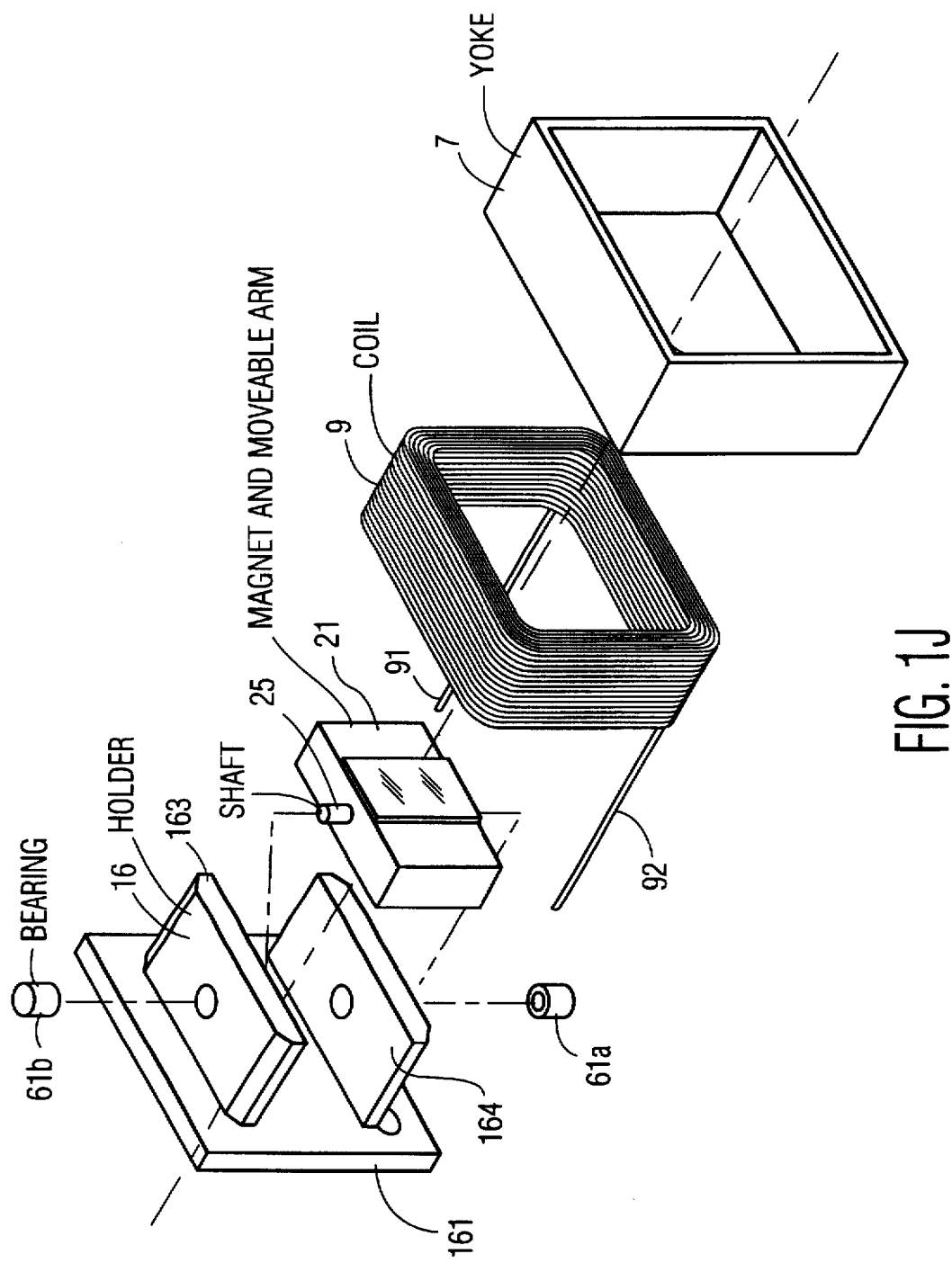
FIG. 1J is a break out of the components of an embodiment of a vibrating mirror assembly in accordance with the invention.

FIG. 1H shows one possible packaging arrangement of the vibrating mirror assembly. FIG. 1J illustrates the various components constituting the vibrating mirror assembly.

In FIGS. 1H and 1J the coil 9 is wound around the holder 16 with a movable bar (arm) magnet 21 held between the top 163 and bottom 164 ledges extending from the back side 161 of the holder 16. The shaft 25 extending about the center of the movable bar magnet 21 (also extending above and below the top and bottom surfaces of the movable bar magnet) is mounted within bearings 61a and 61b on ledges 163 and 164. As per the earlier description this enables the movable bar magnets 21 to rotate freely and easily. The fixed yoke 7 fully encloses and surrounds the coil 9 and the movable arm 2.

The coil ends 91, 92 are intended to be connected to a driver circuit for applying an AC signal or pulses to the coil to cause vibration of the movable bar.

Note that a mirror 12 (not shown in this view) could be mounted on the back side of movable arm 2. The back side 161 of the holder could be cut out, or be transparent, or include a lens arrangment for a mirror 12 mounted on the back side of movable arm 2. Alternatively, the holder 16 and bearing portion could be made to depend from the top and bottom sides of yoke 7. It should be evident that many different packaging arrangements are possible to enable the movable arm 2 to have a first mirror on its front side and a second mirror on its back side, with the movable arm vibrating as taught herein.

Figure 2A:
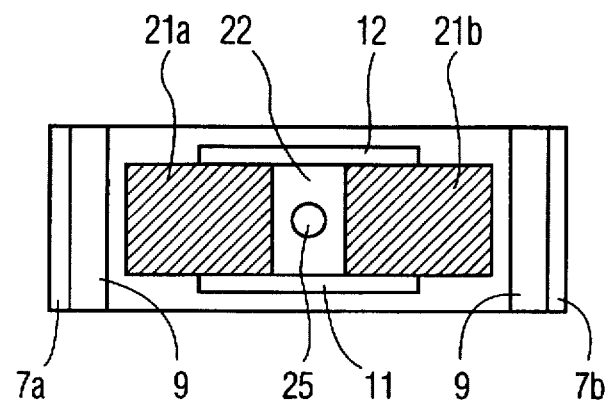
Figure 2B:
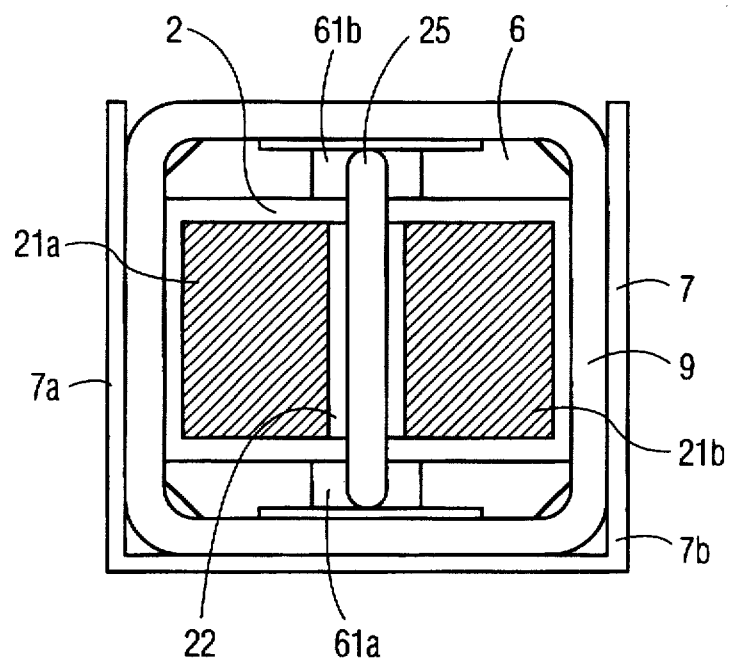
FIG. 2B is a simplified cross sectional view of the vibrating mirror assembly of FIG. 2A.

Referring to FIG. 2B, note that the fixed yoke 7 differs from that of FIG. 1 in that one side of the fixed yoke 7 has been removed. In comparison to the square shaped yoke of FIG. 1B, removing one side increases the magnetic resistance of the magnetic circuit and reduces the magnetic flux density in the gap between the opposite sides 7a, 7b and the movable magnets 21a, 21b. Consequently, the magnetic spring force is reduced and the resonant frequency is reduced. This renders the design less tight and more selectable. In other respects, the operation of the embodiment shown in FIG. 2A and 2B is the same as that of the embodiment shown in FIGS. 1A and 1B.

Figure 3A:
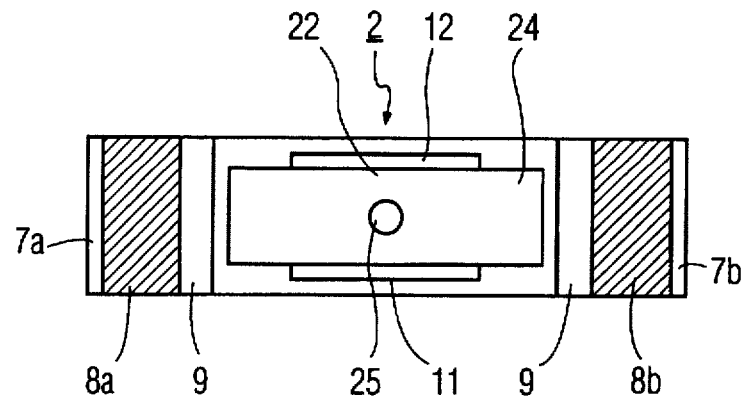
Figure 3B:
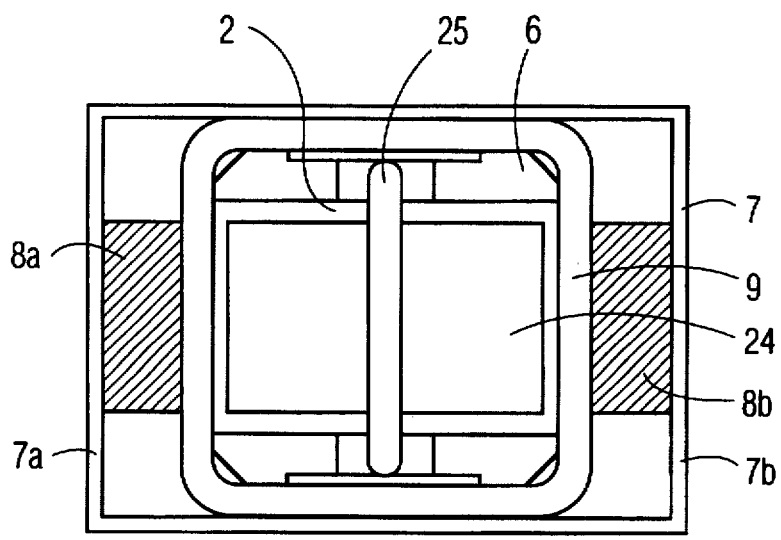
FIG. 3B is a simplified cross sectional view of the vibrating mirror of FIG. 3A.

The embodiment shown in FIGS. 3A and 3B, differs from the embodiments of FIGS. 1 and 2 in that the movable arm 2 is now a magnetic element 24 (not a permanent magnet) and that fixed permanent magnets 8a and 8b are located on either side of the movable arm 2 between the coil region 9 and the fixed (stationary) yoke 7. The attraction force due to the static magnetic field is active at all times between the magnetic element 24 of the movable arm 2 and the adjacent fixed magnets 8a and 8b. This produces a magnetic spring force (rotating moment) which tends to return the movable arm 2 to the stand-still (equilibrium) position. Equations (1) through (6) discussed above are applicable to the embodiment of FIGS. 3A and 3B. But the spring constant (k) in equations (1) through (6) is now a constant proportional to the attraction of the fixed magnets 8a and 8b. The resonant frequency of the movable arm 2 can be adjusted by adjusting the movement of inertia (I) and/or the magnetic spring force due to the fixed permanent magnets 8a and 8b.

In the embodiment of FIG. 3A and 3B, all or part of the magnetic element 24 can be replaced with permanent magnets. In this embodiment the thickness of the fixed magnets 8a and 8b (i.e., the length in the direction of the magnetic circuits can then be reduced. In other respects the operation of the FIG. 3 embodiment shown in FIGS. 3A and 3B is the same as that of the embodiments shown in FIGS. 1A, 1B, 2A and 2B.

It should be appreciated that the embodiment shown in FIGS. 3A and 3B may be further modified by the elimination (or omission) of the stationary (fixed) yoke 7. Yoke 7 may be replaced by using strong magnetic material for stationary fixed magnets 8a and 8b.

Figure 4A:
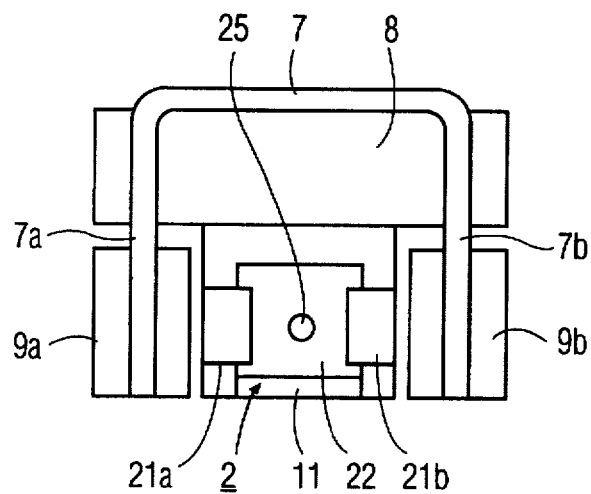
FIGS. 4A, 4B and 4C, represent a top view, front view and side view, respectiveley, of another embodiment of a vibrating mirror assembly embodying the invention.
Figure 4B:
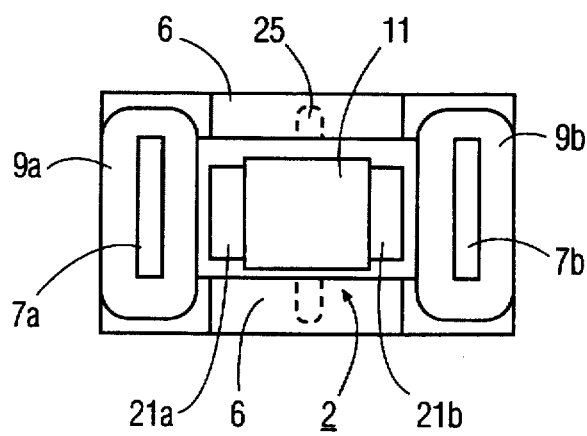
Figure 4C:
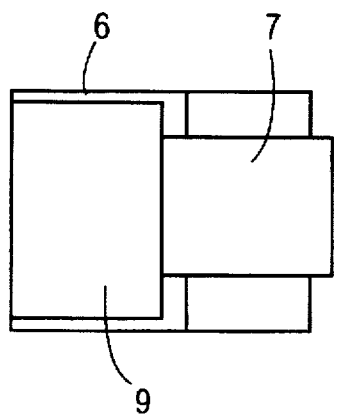

The embodiment shown in FIGS. 4A, 4B and 4C, differs from that of FIGS. 1A and 1B in the respects discussed below.

One side of the fixed yoke 7 is removed from the square shaped yoke of FIG. 1 making it "U" shaped. The opposite sides 7a and 7b are shown to be straight but can be slightly curved or rounded. The movable arm 2 comprises the movable part itself with a rotating axis 25. The movable arm 2 is located between the opposite sides 7a, 7b of yoke 7 and in the position near to the front part, (i.e., near to the opening side of the fixed yoke). The movable arm 2 and the fixed yoke 7 comprise an almost square shaped magnetic circuit. The rotating axis 25 is located vertically (i.e. perpendicularly) to the horizontal plane including the fixed yoke 7. Two sets of driving coils, 9a and 9b, are wound in the front part of the opposite sides of 7a and 7b of the fixed yoke 7. In this embodiment there is only one reflective mirror (scanning mirror 11) which is installed in front of the movable arm 2.

The attraction force due to the static magnetic field between the movable magnets 21a and 21b and the adjacent opposite side 7a, 7b is active at all times. That is, the magnetic spring force (rotating moment) is applied to return the movable arm 2 to standstill (equilibrium) position (as shown in FIG. 4) which is the position where the movable magnets 21a, 21b and the opposite sides 7a and 7b are closest to each other.

When an AC current is supplied to the driving coils 9a, 9b, an AC magnetic field is generated which goes across the movable magnets 21a, 21b and the movable magnetic element yoke 22 in the same direction. This AC magnetic field causes the movable arm to rotate alternately in one direction and then in the opposite direciton.

Figure 5A:
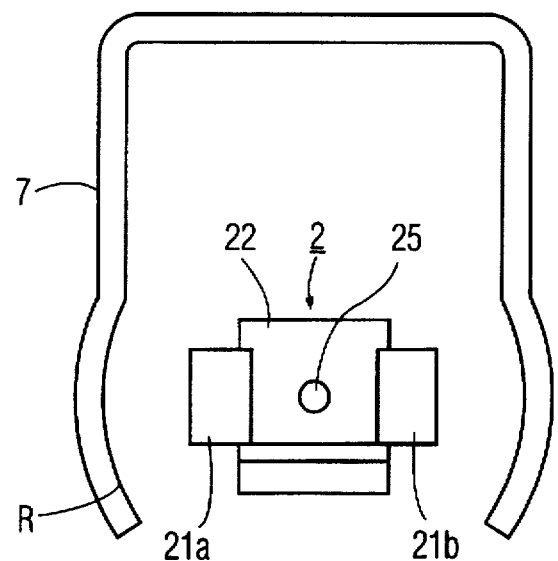
FIGS. 5A and 5B represent a top view and cross-sectional front view of another vibrating mirror assembly embodying the invention.
Figure 5B:
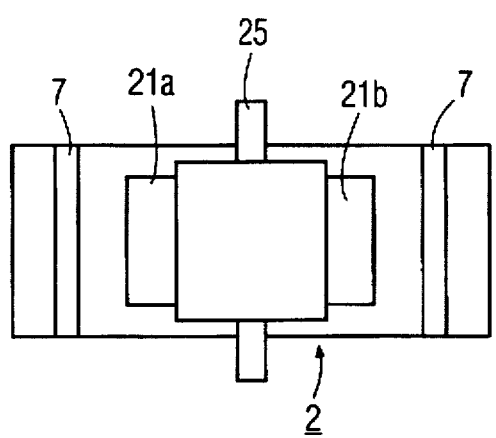

Equations (1) through (6) discussed above apply to the embodiment shown in FIG. 4. When the movable arm 2 is caused to vibrate or oscillate, a light beam incident on the first reflective mirror (scanning mirror 11) mounted on the front of the movable arm 2 is reflected and swept over an optical information pattern (P), (see FIG. 6). In other respects, the operation of the embodiment shown in FIGS. 4A, 4B and 4C is the same as that of the embodiments discussed above. The sides of the fixed yoke 7 shown in FIG. 4A may be curved as shown in FIG. 5A with the cross section of the FIG. 5A embodiment being as shown in FIG. 5B.

It should be appreciated that the stationary (fixed) yoke 7 shown in FIGS. 1A, 1B, 2A, 2B and 4A, 4B and 4C could be omitted. However the equilibrium (or stand-still) position of the movable arm 2 would then only be determinable when an electric current is applied to the driving coils.

The embodiments shown in the attached figures may be also modified by the inclusion of a mechanical spring to restore the movable arm to a stand-still (equilibrium) position after the arm is displaced by some angle Θ. A mechanical spring such as a coil spring, a wound spring or an air spring may be used. The spring constant of the mechanical spring and the resonant frequency of the resulting may be designed with many different options.

Optical Information Reading Device

FIG. 6 illustrates an optical information reading device embodying the inventive vibrating mirror assembly of this patent application.

In FIG. 6:

LF refers to a light beam forming element which could be a laser beam or a light emitting diode (LED) and the means for projecting the light beam onto the vibrating mirror assembly;

VM refers to the scanning device with two vibrating mirrors 11 and 12;

CP refers to a light collecting lens and reflective prism;

PD refers to a Photo Diode;

SP refers to signal processing circuitry; and

AD refers to an AC current supply means.

The scanning device with vibrating mirrors (VM) may be of the type described in FIGS. 1A, 1B, 2A, 2B, 3A and 3B.

The light beam forming element (LF) and the scanning device with vibrating mirrors (VM) are so arranged that the light beam from the light beam forming element (LF) is reflected onto the first reflective mirror 11 mounted on the front side of the vibrating mirror assembly and projected from mirror 11 onto the optical information pattern (P) on the material 101 to be read.

The collective lens and reflective prism (CP) and the scanning device with vibrating mirrors are so arranged that light reflected from the optical information pattern (P) impinges onto the light collective lens and reflective prism (CP). The reflective prism then projects the light reflected from the information pattern onto the second reflective mirror 12 mounted on the backside of the vibrating mirror assembly. The light reflected from mirror 12 is projected onto the light receiving surface of the photo diode (PD).

The source AD is shown connected via wires 91 and 92 to driving coils 9. The source AD may be a source of AC signals or a source of pulses designed to cause the arm 2 of the vibrating mirror assembly to vibrate. As discussed above, the frequency (i.e., scans per second) at which the arm 2 vibrates is a function of the frequency and/or repetition pulse rate of the signals supplied by AD to the driving coil 9 via wires 91,92. The amplitude of the vibration is controlled by the amplitude of the current (or voltage) signal applied by AD to the driving coil 9. As discussed above, supplying a controlling signal to coil 9 such that the arm 2 vibrates at or close to, its resonant frequency enables operation at very low power dissipation level, relatively high rate (i.e., that of the resonant frequency) and avoids the need for mechanical stops since the arm 2 swings back and forth about its equilibrium point.

The operation of the vibrating mirror assembly in a resonant mode or in a non-resonant mode can be controlled by the control signals produced by signal source AD.

In the operation of the system, where a light beam is projected onto mirror 11 and arm 2 is vibrating, the light beam is swept across the information pattern P. As any point on the pattern P is illuminated that illuminated point is reflected via the collecting lens and reflective prism assembly onto mirror 12. Mirror 12 tracks the motion of mirror 11 whereby, mirror 12 catches a greater amount of the information pattern which is being illuminated. The light projected onto mirror 12 is then directed and reprojected onto photodiode (PD). The signals received by the photodiode are then supplied to signal processing circuitry where the information signals are decoded.

It should also be noted that the signal source AD may include coil voltage sensing circuits for scanning voltages produced in the coil 9 due to the vibration of the arm 2 and cutting the flux lines coupling the arm 2 and the fixed yoke 7. These coil voltage sensing circuits may then be used to determine the position of the vibrating arm to control signals applied to the coil 9.

In this specification the "reflective prism" (part of CP in FIG. 6) refers to the prism that receives the light reflected from the target 101 and can make the reflected light beam bundle reflect and change its direction.

The combination of the CP and VM is also referred to herein as a "scanning type light receiving optical system".

All, or part, of the elements shown in FIG. 6 (other than target 101) may be contained in a suitable housing 103 which may be a hand held bar code scanner.

The light collective lens and reflective prism (CP) can be separated into a collective lens and a reflective prism.

The reflective prism can furthermore be used for changing the direction of the light beam and may be a right-angle prism, a square-angled prism, or a 5-angled prism.

The scanning type light receiving optical system embodying the invention gives better results than a fixed type light receiving optical system in its light receiving effectiveness and characteristic against diffused ambient light.

An optical filter attached thereto can be smaller in size. Furthermore, the back side of the vibrating mirror arm 2 (VM) can be used exclusively for light receiving which limits the influence of ambient reflection to a minimum.

Thus, it is important to note that the use of the second "reflective" mirror 12 for sensing the light reflected from the target 101 provides a significant advantage in that there is greater emphasis on, and capture of, the signal resulting from the portion of the target being illuminated by the light source. Therefore, there is a significant increase in the signal-to-noise ratio since the effect of ambient light is reduced.

It is also important to note that by putting a first mirror (e.g 11) on one side (e.g. front) of the vibrating arm 2 and another mirror (e.g. 12) on the other side (e.g. back or rear) of the vibrating arm, that the length of the vibrating arm can be made significantly smaller.

Generally, the scanning type light receiving optical system requires the use of a relatively larger mirror, as the area of the reflective mirror (12) is the light receiving equalized area. But, in this embodiment the light receiving diameter can be bigger (or larger) than the actual area of the reflective mirror 12 by using a specially designed reflective and refractive optic.

The embodiments of the invention may be modified in any of the following ways:

a) The driving coil 9a, 9b shown in the embodiment of FIG. 4 may be removed and instead, a driving coil may be installed inside the fixed yoke 7 in the same manner as shown for the embodiment of FIG. 1.

b) The order of installation arrangement of the fixed yoke 7 and the driving coil 9 which are installed on the same plane may be changed. The fixed yoke 7 may be placed inside closer to the movable arm and the driving coil 9 outside and further away from the movable arm.

c) The wave form of the current supplied to the coil may be a rectangular wave, a triangle wave, or any other cyclic wave.

What is claimed is:

1. An optical reader including:

a rotatable member having two parallel sides;

a first reflective surface formed on one side of said rotatable member for projecting an incident beam of light onto a target and causing said beam of light to sweep across the target;

a second reflective surface formed on the other side of said rotatable member; and a prism for receiving the light reflected from said target and for projecting the reflected light onto said second reflective surface.

2. An optical information reading device comprising:

a light source for producing a beam of light;

a scanning device having a vibrating arm assembly (VM) with a first reflective mirror on one side and a second receiving mirror on an opposite side;

means for projecting said beam of light from said light source onto said first reflective mirror; said first reflective mirror causing said beam of light to be swept across an optical information pattern on a material to be read at a location external to said reading device; and a light collecting lens and light direction converting means arranged such that light reflected from said optical information pattern is directed onto said second receiving mirror; and said second receiving mirror being arranged to project the light reflected from said information pattern onto a photosensing device.

3. An optical information reading device as claimed in claim 2 wherein said light direction converting means includes a reflective prism.

4. An optical information reading device as claimed in claim 3 wherein said light collective lens and said reflective prism are combined to form a light collective lens and also a reflective prism.

5. The optical information reading device as claimed in claim 2 wherein said vibrating arm assembly, said light collecting lens and light direction converting means, and said photosensing device are all contained within a single housing which forms part of a hand held bar code scanner system.

6. An optical information reading device as claimed in claim 2, wherein said vibrating arm assembly includes a movable arm of length L and width W, having one side on which is fixedly located said first reflective mirror for receiving a light beam and for projecting the light beam across a target spaced externally from the scanning device; said movable arm being of magnetic material and being pivoted about its center to permit the arm to rotate freely about its center;

stationary, non-moving, components, external to the movable arm, including a driving coil and a fixed yoke;

said driving coil formed of a plurality of turns of wire closely wound about each other and located between the movable arm and said fixed yoke, said driving coil for receiving an electric current for selectively causing movement of said movable arm; and said fixed yoke being formed of magnetic material, and having sides, with the movable arm located between the sides of the fixed yoke for producing a magnetic circuit coupling the fixed yoke with the movable arm and for establishing an equilibrium position for the movable arm, the magnetic circuit being arranged such that when said movable arm is displaced from its equilibrium position, and in the absence of a current in said driving coil, a restoring torque is present tending to cause the movable arm to oscillate about its equilibrium position.

7. A device as claimed in claim 6 wherein said fixed yoke has four sides fully enclosing the sides of the driving coil and the movable arm.

8. A scanning device as claimed in claim 6 wherein said fixed yoke is generally U shaped having three sides; one side extending along the length of the movable arm and the other two sides extending perpendicularly to the ends of the arm.

9. A scanning device as claimed in claim 6 wherein said movable arm is a permanent magnet.

10. A scanning device as claimed in claim 6 wherein said second receiving mirror is located on the movable arm, the second receiving mirror being located on one side of the arm opposite to the side on which the first reflective mirror is mounted.

11. A device as claimed in claim 6 wherein a holding frame is positioned within the fixed yoke and wherein said movable arm is mounted within said holding frame.

12. A device as claimed in claim 6 wherein the magnetic field produced by the combination of said movable arm and said fixed yoke is of a generally rectangular nature with a middle transverse line in the center of the rectangle defining two generally square shaped regions, with the equilibrium position of said movable arm lying along the transverse line.

13. An optical reading device comprising:

a movable arm of magnetic material extending between two side walls of magnetic material and defining a magnetic field causing said movable arm to have a stand-still position about which the movable arm oscillates when displaced from said stand-still position; said movable arm having front and back sides;

a driving coil located between the ends of the movable arm and the two side walls;

means for selectively applying varying current signals to the driving coil for inducing a magnetic field causing the movable arm to oscillate back and forth about said stand still position;

a first reflective surface located on the front side of said movable arm for causing a light beam incident on said first reflective surface to be projected onto a target external to the optical reading device; and a second reflective surface located on the back side of said movable arm for receiving light reflected from the target due to the light beam projected thereon.

14. An optical reading device as claimed in claim 13 including:

a light source for producing a beam of light; and means for projecting said beam of light onto said first reflective surface.

15. An optical reading device as claimed in claim 14 including a light collecting lens and light direction converting means arranged such that light reflected from said target is directed onto said second reflective surface.

16. An optical reading device as claimed in claim 15 including a photosensing device and wherein said second reflective device projects the light incident on it into said photosensing device.

* * * * *